Figure 1:
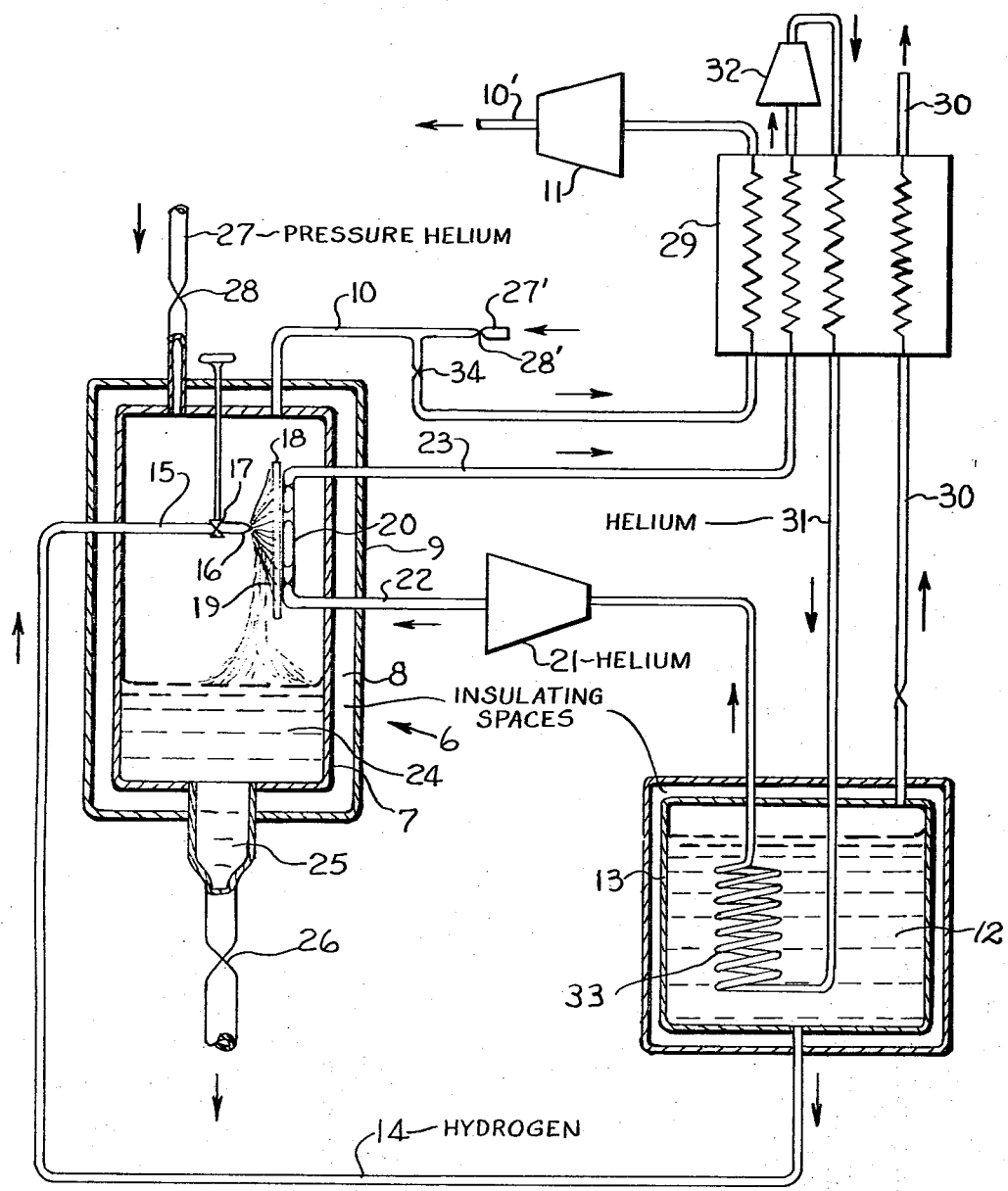

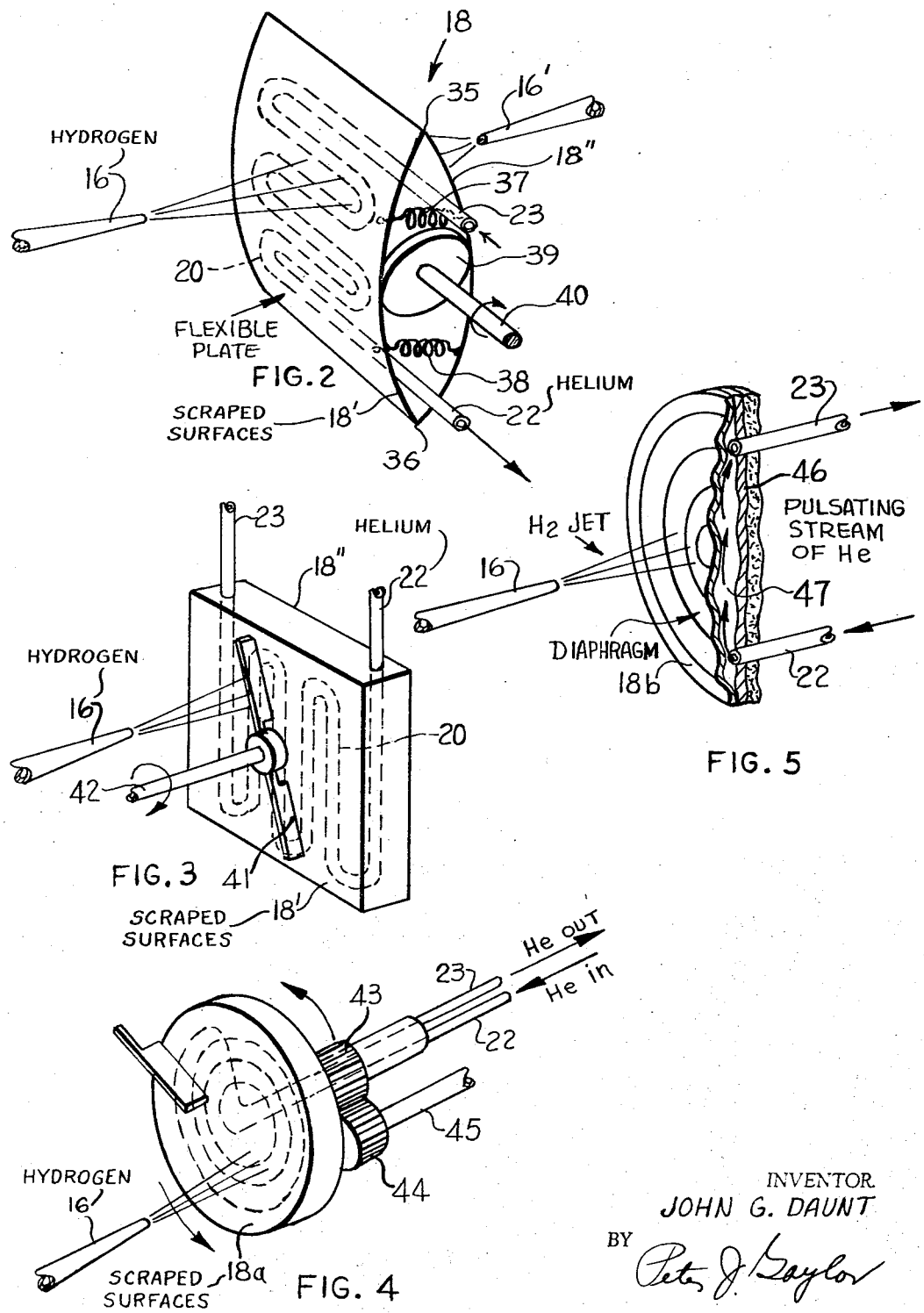

3,354,662
DYNAMIC FLASH PRODUCTION OF HYDROGEN SLUSH

John G. Daunt, Columbus, Ohio, assignor to Malaker Laboratories, Inc., Parsippany, N.J., a corporation of New Jersey
Filed Feb. 21, 1964, Ser. No. 346,488
7 Claims. (Cl. 62—10)

This invention relates to the production of hydrogen slush by a dynamic flash deposition method. More specifically, it deals with the production of hydrogen slush by impingement of a jet of liquid hydrogen upon a surface cooled below the temperature of the liquid hydrogen, removal of the slush from the surface, and removal of the slush from an evacuated slush-producing vessel.

Hydrogen slush is a mixture of liquid and solid hydrogen in a form suitable for moving around as a liquid. Such a slush is highly suitable as a fuel for various uses, as for rocket propulsion, and the like. Its advantage over liquid hydrogen is that it has about 10% less volume for the same mass. Also, when employed as a fuel, it possesses potential latent heat of melting, which property may be utilized for further cooling of the fuel reservoir.

In his article "Hydrogen Subcooling for Aerospace Vehicles," 1963, Charles W. Elrod mentions a number of possible methods which may be used for the production of hydrogen slush, many of which have been used or tried with varying degrees of success. The main determining factor as to the suitability of a method for producing liquid-solid mixtures of hydrogen, is the solid content of the slush. The higher the solid content, the better the method, that is, as long as the slush is in a movable or transferable form. Another important factor of a slush-producing method is the amount, if any, of stirring required to produce homogenous slush. It has been known for some time that hydrogen slush of high solids content is difficult, if not impossible, to homogenize by stirring. Hence, some method must be devised to avoid such an operation. Since static methods of slush production inherently require some sort of stirring operation, a dynamic method of slush production is preferred.

According to the method of the present invention, hydrogen slush of very high solid content is produced in a dynamic, continuous manner, requiring neither stirring of the product, nor transfer of the slush through pipes during its manufacture. This dynamic flash deposition method comprises basically of the introduction of a jet of flashed liquid hydrogen into a partially evacuated chamber, the jet and the flashing being effected by forcing the liquid hydrogen from a storage tank, at about 20° K., through one or more flash valves in parallel, and subsequently through a nozzle or nozzles which the liquid hydrogen is ejected as an atomized jet stream. The liquid hydrogen is cooled by the flashing operation, and the vapor residue is evacuated from the chamber by means of a vacuum pump. The cooled liquid issuing from the nozzle or nozzles, in the form of a fine jet spray, impinges upon the surface of a cooled plate, such as one cooled by circulation or evaporation of cold helium gas within an enclosure in thermally conductive relation to the reverse side of the hydrogen freezing surface.

Dependent upon the temperature of the cooled surface, and the rate of deposition thereon of liquid hydrogen, the solid hydrogen formed can be regulated to be of desired quality capable of falling off the plate, provided the plate is positioned vertically, or at a suitable angle thereto, or capable of being swept off by suitable scraping means, or removed by vibratory means, and is thereafter collected at the bottom of the evacuated chamber in the form of a movable slush. The quality of the slush (i.e., the slush density) may be adjusted by adjustment of flash pressure, nozzle configuration, cooling plate temperature, and hydrogen flow rate. After deposition at the bottom of the slush chamber, the hydrogen slush may be withdrawn through a suitable outlet.

The invention may be more readily understood by reference to the accompanying drawings in which a preferred embodiment is described, and in which FIGURE 1 depicts a flow diagram, partly in schematic form, of a hydrogen slush-producing process, while FIGURE 2 presents a side perspective view of a cooling plate of the present invention. FIGURES 3 and 4 illustrate similar views of different embodiments of cooling plates, employing scrapers, suitable for the present invention, while FIGURE 5 shows a similar cross-sectional side view of a cooling plate employing a pulsating stream of helium as the cooling medium. Similar numerals refer to similar parts in the various figures.

Referring again to the drawings, and particularly to FIG. 1, numeral 6 shows generally a cross sectional view of an evacuated flash chamber having inner wall 7 separated in insulating relation (by space 8, for example) from outer wall 9. The pressure in chamber 7 preferably corresponds to the triple point pressure of hydrogen. For normal $H_2$, this pressure is approximately 13.8 mm. Hg. Line 10 connects the upper portion of chamber 7 with vacuum pump 11. Liquid hydrogen 12, stored in similarly-insulated tank 13 at atmospheric or higher pressure may be drawn through line 14, which line is led, as extension 15, into chamber 7, where it terminates with nozzle 16. Flow through this nozzle is controllable by means of valve 17.

Disposed directly opposite nozzle 16 is vertical (or vertically-inclined) impingement plate 18, preferably having a smooth hydrogen-impingement surface 19, and cooled on the opposite side by cooling coil 20. The temperature of plate 18 is maintained at about 5° to 10° K. Coil 20 is cooled by evaporating helium or cold helium gas coming from helium expander 21 (which may consist of an evaporator), the cold gas entering coil 20 through line 22, whereupon it absorbs heat from plate 18, and then the helium gas it discharged out of chamber 7 through line 23.

Liquid hydrogen 12 from tank 13 is forced through line 14, to be ejected as a high velocity spray from jet 16, the velocity of the jet being controlled by valve 17. As the jet of liquid hydrogen impinges upon surface 19 of cooled plate 18, while chamber 7 is being evacuated by pump 11, a portion of the liquid hydrogen is solidified, and both the solid and liquid hydrogen drop to the bottom of chamber 7 in the form of a slush 24, which slush may be drawn through outlet 25 and valve 26. The discharge of the slush is facilitated by shutting off pump 11 and by forcing helium gas under pressure through line 27, whereby slush 24 is easily removed from chamber 7, in which case valve 28 is opened. A vent line 30 is provided on top of hydrogen storage tank 13.

A heat exchanger 29 is employed to permit the exiting cold gases in lines 10, 23, and 30 to cool incoming helium in line 31. Helium gas, leaving chamber 7 in line 23, is compressed in compressor 32, and is passed through line 31 and thence through coil 33 immersed in the liquid hydrogen 12, where it is precooled to about say 20° K., after which it passes through expander 21 to be cooled further before entering cooling coil 20 to cool plate 18. Use, of the hydrogen storage 12 to cool the helium in coil 33 effects considerable savings in the slush production costs. Hydrogen leaving outlet 10' may be recovered.

An alternate form of cooling plate 18 is shown in FIG. 2. In this case, the plate consists of two plates 18' and 18" joined at tops 35 and bottoms 36. Between these two plates is disposed cooling coil 20 into which cold helium is fed through inlet line 22 and removed through outlet line 23. The two plates are connected by springs, 37 and 38, which are designed to keep the two plates close to coil 20, at which time cam 39 is at right angles to the position shown in FIG. 2. Liquid hydrogen is forced through nozzles 16 and 16' to impinge hydrogen on both plates simultaneously. Cam 39 is turned by shaft 40, and by a motor (not shown), at intermittent intervals, to the position shown in FIG. 2, by which flexing of plates 18' and 18" any solid hydrogen adhering to plates 18' and 18" is freed and allowed to drop into slush 24.

In FIG. 3, plates 18' and 18" are similarly cooled by coil 20. In this case, a squeegee or doctor blade 41 is rotated by shaft 42 and a motor (not shown) in order to scrape off adhering solid hydrogen. In FIG. 4, plate 18a is rotated via its gear 43 and connected gear 44, the latter being turned by shaft 45 and motor (not shown). Cold helium is fed in through line 22, after which it takes up heat from plate 18a, and the heated helium is drawn out through line 23. In FIG. 5, the cooled plate 18b is a flexible diaphragm the edge of which is attached, in outside sealing relation, to a rigid insulated plate 46. A pulsating stream of helium is forced through line 22, and it passes through space 47 between plates 46 and 18b, taking up heat from plate 18b, and it issues through line 23. The pulsation, which may be continuous or intermittent, is designed to flex or vibrate diaphragm 18b against which the hydrogen jet is impinged from nozzle 16, whereby any adhering solid hydrogen is removed from the diaphragm and dropped into slush 24.

This dynamic flash deposition method for the production of hydrogen slush has numerous advantages over methods now employed for producing the material. For example, a movable slush of high quality, close to 100% solid may be readily produced. Also, this continuous process lends itself to large scale continuous production of the material, heretofore not possible when batch processes have been used. Although it is a dynamic process, it does not involve transfer of hydrogen slush through valves and pipes during the manufacture of the material, a feature highly sought due to the extreme difficulty in moving such slush of high solid concentration. After manufacture, it is merely forced by pressure out of outlet 25 and valve 26.

A highly desirable feature of the present invention is the fact that this process does not require stirring of the slush which is generally required in most of the known processes, due to the poor thermal conductivity of both liquid and solid hydrogen. The fact that the solid is formed only as a thin layer on the cooling plate, which layer is removed immediately thereafter, making possible subsequent deposition of further solid, overcomes the drawback of the poor thermal conductivity of the product. The fact that the slush is collected only as it is made further minimizes the size required for the flash chamber, and eliminates the need for a vessel which must hold the entire production run of slush. In addition to this, the process here lends itself to use of portable equipment which can be used to deposit slush directly into a space or transport vehicle. Another important and valuable characteristic of the present method is the ease in which slush quality may be controlled, simply by varying flow rate, cooler plate temperature, nozzle configuration, and the like. Finally, by means of the present process, the character of the solid hydrogen particles may be varied, according to preselection, to amorphous, crystalline, or mixed solid granules, as desired, by selection of the variables already mentioned.

Although a separate pressure inlet line 27 is shown in FIG. 1, it is to be understood that a branch line 27' tapped into line 10 (with a valve 28') may be employed for the same purpose.

I claim:
1. A process for producing hydrogen slush, comprising:
   forcing liquid hydrogen from a storage tank through a nozzle to produce a jet stream,
   impinging said jet stream upon a cooled surface disposed in an evacuated chamber,
   removing hydrogen slush formed at said cooled surface and depositing it at the bottom of said chamber,
   feeding cooling medium through a coil disposed in said tank to cool said medium, then
   expanding said cooling medium to further lower its temperature, passing said cooling medium into said chamber to cool said surface,
   drawing said cooling medium out of said chamber and compressing it for recycle, and
   removing hydrogen slush from said chamber.
2. A process for producing hydrogen slush, comprising:
   forcing liquid hydrogen from a vented storage tank through a nozzle to produce a jet stream, impinging said jet stream upon a cooled surface disposed in an evacuated chamber,
   continuously removing hydrogen slush formed at said cooled surface and depositing it at the bottom of said chamber,
   feeding cooling medium through a coil disposed in said tank to cool said medium,
   expanding said cooling medium to further lower its temperature, then passing said cooling medium into said chamber to cool said surface,
   drawing said cooling medium out of said chamber and compressing it for recycle,
   passing the evacuation hydrogen stream, the tank vent hydrogen, and the compressed cooling medium into heat exchange with cooling medium leaving said chamber, and withdrawing hydrogen slush from said chamber.
3. An apparatus for producing hydrogen slush, comprising:
   an insulated storage tank, designed to hold liquid hydrogen, and having a vent near the top, and an outlet line near the bottom,
   an insulated flash chamber, designed to be evacuated, and having a slush outlet at the bottom, and a pressurizing and evacuating line near the top,
   a cooling medium line carrying cooling medium and designed to enter said tank and to contact liquid hydrogen in indirect contact therein, and to leave said tank,
   a cooling medium expander disposed in said cooling medium line leaving said tank and designed to expand a cooling medium to reduce further its cooling property,
   a cooling line leaving said expander and designed to carry a further-cooled medium, and entering said chamber and forming a cooling area therein and having an outlet passing out of said chamber,
   a cooling plate disposed in thermal contact with said cooling area and designed to cool liquid hydrogen to solid form,
   a liquid hydrogen line connecting at one end with said tank outlet and entering said chamber and having a valve for regulating flow therethrough,
   a nozzle disposed at the other terminus of said liquid hydrogen line and designed to impinge a spray of liquid hydrogen upon said cooling plate, whereby a hydrogen slush is produced, which slush falls to the bottom of said chamber,
   a compressor connected into said cooling line outlet and designed to compress a cooling medium for recycle, said compressor having an outlet line connecting with said cooling medium line, and
   a vacuum pump attached to the evacuating line of said chamber.
4. An apparatus for producing hydrogen slush, comprising:

an insulated storage tank, designed to hold liquid hydrogen, and having a vent near the top, and an outlet line near the bottom, an insulated flash chamber, designed to be evacuated, and having a slush outlet at the bottom, and a pressurizing and evacuating line near the top, a cooling medium line carrying cooling medium and designed to enter said tank and to contact liquid hydrogen in indirect contact therein, and to leave said tank, a cooling medium expander disposed in said cooling medium line leaving said tank and designed to expand a cooling medium to reduce further its cooling property, a cooling line leaving said expander and designed to carry a further-cooled cooling medium, and entering said chamber and forming a cooling area therein and having an outlet passing out of said chamber, a cooling plate disposed in thermal contact with said cooling area and designed to cool liquid hydrogen to solid form, a liquid hydrogen line connecting at one end with said tank outlet and entering said chamber and having a valve for regulating flow therethrough, a nozzle disposed at the other terminus of said liquid hydrogen line and designed to impinge a spray of liquid hydrogen upon said cooling plate, whereby a hydrogen slush is produced, which slush is deposited at the bottom of said chamber, a compressor connected into said cooling line outlet and designed to compress a cooling medium for recycle, said compressor having an outlet line connecting with said cooling medium line, a heat exchanger designed to transfer heat from said compressor outlet line to said chamber evacuating line, said chamber cooling line outlet, and said tank vent line, and a vacuum pump attached to the evacuating line of said chamber downstream with respect to said heat exchanger.

5. An apparatus for producing hydrogen slush according to claim 3 in which the cooling plate has a smooth impingement surface, and scraping means designed to scrape solid hydrogen therefrom.

6. An apparatus for producing hydrogen slush, comprising:

an insulated flash chamber, designed to be evacuated, and having a slush outlet at the bottom, and a pressurizing and evacuating line near the top, a cooling line entering said chamber and forming a cooling area therein and having an outlet passing out of said chamber, a flexible cooling plate disposed in thermal contact with said cooling area and designed to cool liquid hydrogen to solid form, flexing means disposed adjacent said plate and designed to flex the plate so as to remove adhering solid hydrogen therefrom, a liquid hydrogen line entering said chamber and having a flow valve for regulating flow therethrough, and a nozzle disposed at the inner terminus of said liquid hydrogen line and designed to impinge a spray of liquid hydrogen upon said cooling plate, whereby a hydrogen slush is produced, which slush falls to the bottom of said chamber.

7. An apparatus for producing hydrogen slush, according to claim 6, in which the cooling means is helium and in which said flexing means comprises vibratory means for vibrating said cooling plate.

References Cited

UNITED STATES PATENTS

| | | | |
|---|---|---|---|
| 1,283,017 | 10/1918 | Zavarkin | 62—347 |
| 3,242,684 | 3/1966 | Null et al. | 62—40 |

FOREIGN PATENTS 6,422  11/1906  France.

OTHER REFERENCES

Hydrogen Subcooling for Aerospace Vehicles, Elrod, 1 EEE Transactions on Aerospace, vol. AS-1, No. 2, August 1963, pages 864–873.

WILBUR L. BASCOMB, JR., *Primary Examiner.*

NORMAN YUDKOFF, *Examiner.*

V. W. PRETKA, *Assistant Examiner.*